United States Patent

Cook

[15] 3,651,497

[45] Mar. 21, 1972

[54] DYNAMICALLY TERMINATED MEMORY LINE SELECTION SCHEME

[72] Inventor: William M. Cook, Westminster, Calif.

[73] Assignee: Electronic Memories and Magnetics Corporation, Los Angeles, Calif.

[22] Filed: June 29, 1970

[21] Appl. No.: 50,366

[52] U.S. Cl. .............340/174 LA, 340/174 AD, 340/174 M, 340/174 TB

[51] Int. Cl. .......................................G11c 7/00, G11c 11/06

[58] Field of Search .................340/174 M, 174 TB, 174 LA, 340/174 AD

[56] References Cited

OTHER PUBLICATIONS

IBM Technical Disclosure Bulletin, Vol. 9, No. 7, Dec. 1966, pp. 928–929

*Primary Examiner*—James W. Moffitt
*Attorney*—Samuel Lindenberg and Arthur Freilich

[57] ABSTRACT

A drive system for a magnetic core memory is disclosed using a pulsed current source to charge a selected group of lines common at one (sink) end and simultaneously raising the bias on the other open (drive) end. When the group has been charged sufficiently to forward bias a diode connected to a supply voltage $V_S$, a termination resistor having a resistance approximately equal to the characteristic impedance of all lines common at the sink end, suppresses reflections and ringing. The output of the sink current source is connected to an isolating diode at the drive end of each line by a resistor, whereby the bias across the diode remains substantially constant as the lines are charged. A drive current source is selectively connected to one line of the selected (sink) group. A coupling diode in series with a resistor connected to a source of bias potential terminates the drive end of the selected line during the drive current rise time. When the sink current source is turned off after a memory cycle, a shunt switch is turned on to allow the selected group of lines to discharge to a level of approximately zero volts with respect to circuit ground. Two corresponding, but complementary sets of components are provided for read and write cycles with one shunt switch on during any given cycle to reduce voltage stresses on selection elements.

25 Claims, 4 Drawing Figures

*INVENTOR.*
WILLIAM M. COOK

*BY*

Lindenberg, Freilich & Wasserman

ATTORNEYS

INVENTOR.
WILLIAM M. COOK
BY
Lindenberg, Freilich & Wasserman
ATTORNEYS

INVENTOR
WILLIAM M. COOK
BY Lindenberg, Freilich & Wasserman
ATTORNEYS

DYNAMICALLY TERMINATED MEMORY LINE SELECTION SCHEME

BACKGROUND OF THE INVENTION

This invention relates to magnetic core memory systems, and more particularly, to dynamic termination of selected drive lines.

In magnetic core memories, it is common practice to arrange toroidal cores in rectangular arrays of rows and columns. Separate lines pass through the cores in both rows and columns to addressably write in and read out data by selectively switching cores. For example, in a coincident current core memory, each row and each column of cores has a drive line through which half select current is driven in a given direction to read, and in the opposite direction to write a data bit at the intersection of two energized lines. In a conventional coincident-current system, which can be referred to as a 3D system, bits of all words are uniquely defined in bit planes by series connected $x$ and $y$ drive lines. The selection of one of a set of column read-write switches together with the selection of one of a set of row read-write switches will address all bits of a given word.

In an arrangement commonly referred to as a 2½D system, drive lines in one dimension serve both as address lines and as data bit lines while drive lines in the other dimension serve only as word address lines. A 2½D system has many known advantages over 3D systems. The most important is that the drive lines will be much shorter than drive lines in a 3D system of comparable memory capacity, thereby allowing faster rise times for current pulses with relatively low drive voltage. However, it is still necessary to provide for termination of all drive lines with their approximate characteristic impedance without excessive power dissipation. At the same time, rapid charging and discharging of selected drive lines must be achieved with a minimum of waveform distortion.

OBJECTS AND SUMMARY OF THE INVENTION

An object of the present invention is to achieve dynamic termination of selected drive lines, and is applicable to 2½D and 3D systems.

Another object of the present invention is to provide adequate termination of selected lines without the use of large power dissipating resistors, thereby reducing power dissipation without tolerance degradation due to noise and cross-talk.

Another object is to reduce voltage and current stress levels of semiconductor devices in line selection networks.

These and other objects of the present invention are achieved by providing dynamic termination of memory selection and drive lines to allow controlled charging and discharging of a selected drive line during normally wasted time periods of a memory cycle without excessive power dissipation. During a drive line selection period, a current pulse source is activated to supply energy for charging a group of drive lines. When a common junction or distribution line to which all drive lines in the selected group are connected at their sink end reaches a desired voltage level $V_S$ after a time determined by the magnitude of the charging current and the sink capacitance, a diode in series with a terminating resistor is forward biased to terminate the sink end of the lines to a voltage source $V_S$. The voltage at the output of the current pulse source back biases a group of diodes connected at the drive end of each line of the group through separate resistors to provide open circuits at the drive ends of the lines after the charging period, while allowing absorption of energy during the charging period, thereby reducing voltage stress across the diodes at the drive end of the line, and reducing noise and reflections.

At the termination of the read or write cycle, a switch connected to the charging output of the current pulse source provides a low impedance path to a source of potential sufficiently low to permit the common junction at the sink end of a group of lines to discharge through a diode.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
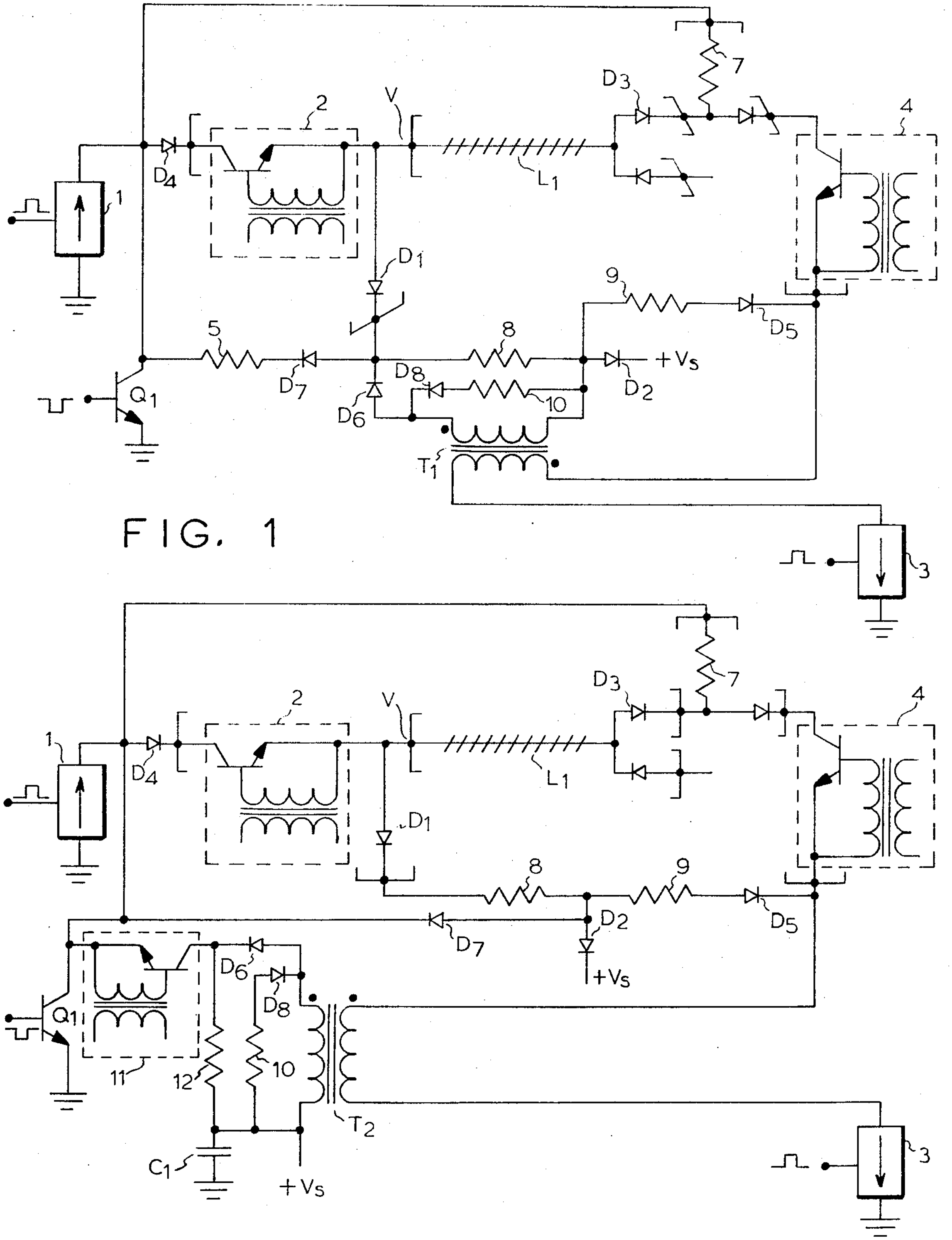
FIG. 1 is an illustrative implementation of the present invention in a section of a magnetic core memory matrix.
FIG. 2 is a modification of the implementation illustrated in FIG. 1.

Referring now to the drawings, FIG. 1 illustrates the present invention in a simplified illustrative implementation showing only one line $L_1$ of M lines in a magnetic core memory. A fan-out from any junction in the figure is schematically indicated by incomplete lines connected to the junction and bent in the direction of the fan-out. A current pulse source 1 of only one polarity is shown for charging the line $L_1$ through a selection switch 2 while a transistor $Q_1$ is cutoff, and a read current pulse source 3 of proper polarity is shown for driving current through the line $L_1$ after a selection switch 4 is closed once enough time has been allowed for the line $L_1$ to be charged. However, it is to be understood that a similar set of components is provided for charging and driving the line $L_1$ oppositely for a write cycle, as will be described with reference to FIG. 3.

The transistor $Q_1$ is normally turned on to provide a low impedance to ground for the group of lines selected by the switch 2, and for other similarly selected groups at their sink end through a resistor 5. A low impedance to ground is also provided to associated groups of lines at their drive end through a resistor 7.

To begin a read cycle, the transistor $Q_1$ is turned off simultaneously with the activation of the pulse current source 1 and the selective actuation of the switch 2. The drive current source 3 is not activated until the switch 4 is to be selectively actuated.

The source 1 supplies energy to charge the line $L_1$, and all other lines connected to a point V at the sink end, and increase the bias voltage at the resistor 7 at the drive end of the line, and similar resistors for other unselected lines. When the point V is charged sufficiently above $V_S$ to forward bias diodes $D_1$ and $D_2$, a resistor 8 terminates the lines connected to the point V and suppresses reflections and ringing.

The drive selection network of the line $L_1$ is also charged toward $V_S$ through the resistor 7. Thus, the voltage developed at the collector of the cut-off transistor $Q_1$ back biases all drive selection diodes through their respective bias pull-up resistors, such as selection diode $D_3$ through its bias pull-up resistor 7. This allows the line $L_1$ to be quickly charged from the sink end, via the switch 2 and the drive end to be biased via the resistor 7. A diode $D_4$ is connected in series with the switch 2 to prevent sneak discharge current through the selection switch 2 when the transistor $Q_1$ is turned on. Switch 4 may be activated at any time prior to or simultaneously with turning on the current source 3.

Once the point V has achieved the full voltage of $+V_S$ (plus the voltage across the resistor 8 and the two diodes $D_1$ and $D_2$), the drive current pulse source 3 is activated to drive read current through the line $L_1$. A diode $D_5$ is then forward biased to terminate the drive end of the line $L_1$ with a resistor 9 during the drive current rise time. It should be noted that while the resistor 8 is selected to be equal to approximately the characteristic impedance of a group of lines connected to the point V, the resistor 9 is selected to be equal to approximately the characteristic impedance of only the one line being driven. The selection of resistance in each case can only be an approximation because the impedance of a line varies as the data stored in cores on the line changes.

During the flat top of the drive current pulse from the source 3, the current in the resistor 9 reduces to near zero because of the approximately equal voltage dropping from point V to the voltage source $V_S$ through the resistor 8 and from point V to the cathode of the diode $D_5$ through the line $L_1$ and the switch 4.

Current driven through the line $L_1$ will tend to discharge point V, thereby causing opposite current to flow in unselected lines connected to point V. In other words, current through the line $L_1$ would normally cause a reduction in the potential at point V due to the source impedance at that point. To eliminate that kind of sneak current in unselected lines, a transformer $T_1$ having a one-to-one turns ratio, and low leakage inductance, is provided with its primary winding in series with the source 3 and its secondary in parallel with the resistor 8. The polarity of the secondary winding is selected to drive current through the resistor 8 thereby replacing current from the switch 2 into point V to maintain point V at a substantially constant potential, and thereby eliminate sneak currents through unselected lines. A diode $D_6$ is forward biased by the induced voltage across the secondary winding, and a diode $D_8$ and resistor 10 shunt stored energy when the selection switch 4 is turned off. The foregoing sink voltage stabilization technique is described further in a copending application Ser. No. 50,563 of P. A. Harding filed concurrently herewith entitled Magnetic Core Memory Line Sink Voltage Stabilization System. However, that technique does not comprise part of the present invention which merely assumes suitable means is provided for maintaining the voltage of point V substantially constant.

At the termination of the drive pulse interval, both sources 1 and 3 are turned off, and the transistor $Q_1$ is turned back on to discharge the selected group of lines through the resistor 5 and a diode $D_7$. The low impedance of the transistor $Q_1$ also returns all positive drive bias resistors, such as resistor 7, to circuit ground, as shown, (or to a negative voltage equal to the voltage drop across approximately three diodes so that point V will be at circuit ground potential). As will be more fully appreciated from the following description with reference to FIG. 3, the transistor $Q_1$ remains turned on during a negative (write) drive interval while a complementary set of components are activated, thereby reducing voltage stresses on selection elements to approximately half what would otherwise normally be experienced.

FIG. 2 illustrates some modifications of the embodiment of FIG. 1. To facilitate understanding the differences, like components are identified by the same reference numerals. The terminating resistors 8 and 9 function the same during the charging period and the current pulse drive period. The bias pull-up resistor 7 also functions the same to raise the bias voltage on the cathode of the selection diode $D_3$ as the point V is charged in order to effectively charge the line $L_1$, and to reduce voltage stress level of the diode $D_1$ and the selection diode $D_3$. These are the principal elements of the dynamic termination system provided in accordance with the present invention.

The significant modifications are in the connection of the sink voltage stabilization means and the discharge path for the point V. In the embodiment of FIG. 1, the transformer $T_1$ is connected across the termination resistor 8 and the discharge of the point V is provided through the resistor 5. That resistor 5 is omitted in the embodiment of FIG. 2, and the point V is discharged through the resistor 8 and diode $D_7$ after the current drive pulse period. During the drive pulse period stabilization current to the point V is provided directly at the input of the selection switch 2. That is accomplished by a balanced transformer $T_2$ polarized as shown by the dot convention.

A switch 11 is turned on simultaneously with the current pulse source 3 to provide a current path to the point V, via the switch 2, thereby replacing current from the switch 4 into point V. A resistor 12 forward biases the diode $D_6$ during the current pulse stabilization period, and a capacitor $C_1$ filters noise and switching transients from the bias voltage.

Figure 3:
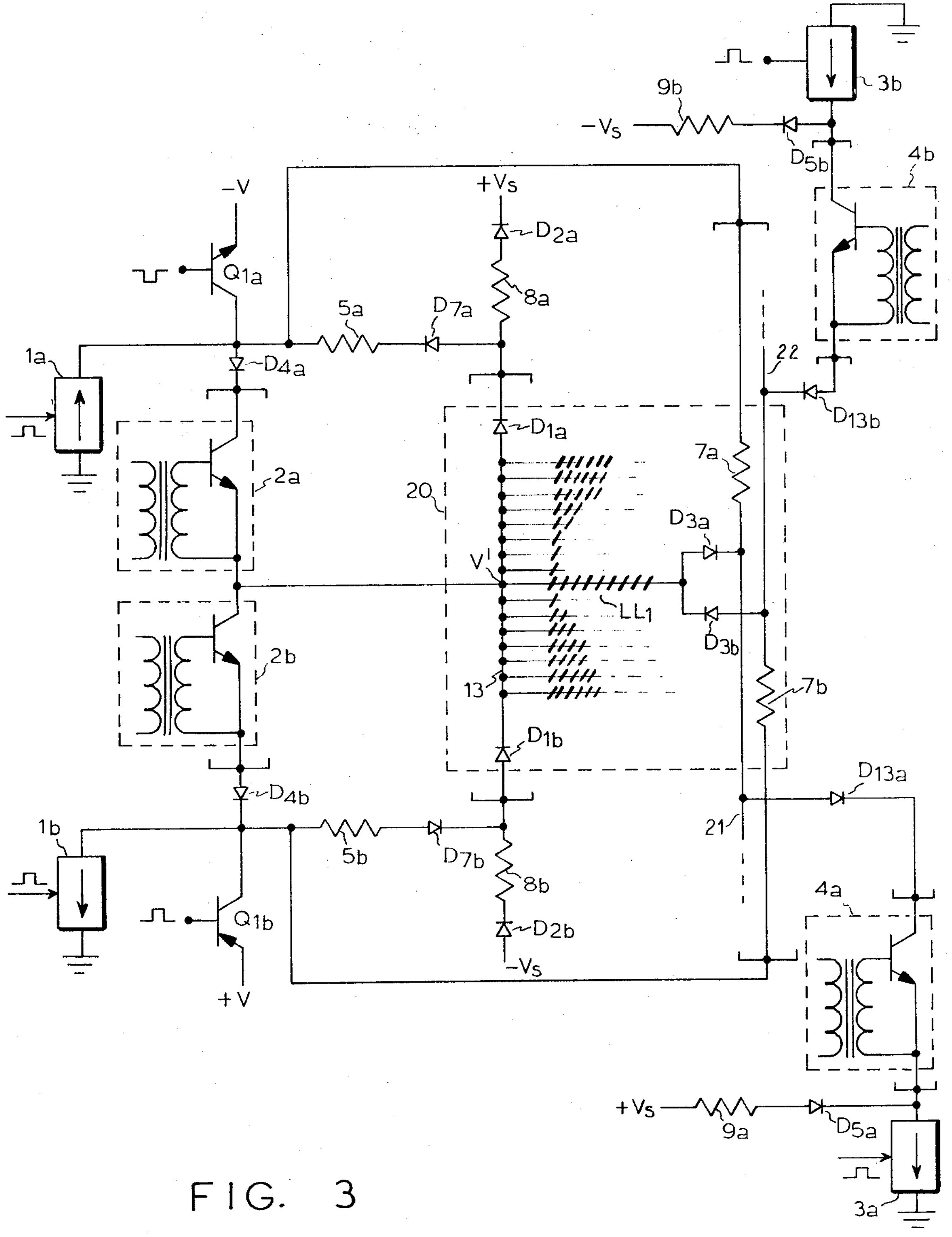
FIG. 3 is a schematic diagram of one section of a line drive system provided in accordance with the present invention.

Referring now to FIG. 3, a plurality of magnetic core drive lines are shown connected to a point V′ through a low impedance distribution line or bus 13 for selection at the sink end in response to activation of one of two selection switches 2*a* and 2*b*, and one of two pulsed current sources 1*a* and 1*b*, depending upon the direction of current flow desired through a selected drive line. Dynamic termination of a line $LL_1$ is in accordance with the embodiment of FIG. 1, but could be in accordance with the embodiment of FIG. 2.

A single drive line is selected from the group connected to the point V′ by activating an appropriate one of a pair of a plurality of selection switch pairs depending on the polarity of current desired. Only one pair is shown comprising switches 4*a* and 4*b* coupled to a single line of the group through isolating diodes $D_{3a}$ and $D_{3b}$ connected in series with drive diodes $D_{13a}$ and $D_{13b}$, respectively, each pair of series connected diodes being poled for conduction when the drive switch connected to the drive diode of the pair is activated.

Pulse drive current sources 3*a* and 3*b* of proper polarity are connected to the line drive select switches 4*a* and 4*b*, respectively. The appropriate group and line selection switches may be activated simultaneously with a pulsed current source at the sink end, but a pulsed drive current source is not activated until all lines from the group selected have been charged, as described with reference to FIG. 1. For example, to read from the drive line $LL_1$ shown, the switches 2*a* and 4*a* may be activated simultaneously with the positive current source 1*a*, but the drive current source 3*a* is not activated until sufficient time has been allowed to charge the drive line. That time will depend upon the particular system. If the drive line is a word line of a 3D or a large 2½D system, its total length may be ten or more feet.

Transistors $Q_{1a}$ and $Q_{1b}$ are normally conducting, and are selectively turned off while the respective switches 2*a* and 2*b* and current sources 1a and 1b are activated. Then, after each memory read or write cycle, the transistor $Q_{1a}$ or $Q_{1b}$ (turned off for the cycle) is again turned on to provide a low impedance path to discharge the distribution line 13.

Before proceeding with a description of the present invention, the manner in which the circuits described thus far is used will be described with reference to word drive lines of a 2 1/2D system by way of example, and not by way of limitation. Assuming the memory includes 1,024 word lines (*x*-drive lines), the word lines may be grouped into 4 blocks of 16 groups of 16 lines each, for example. The current sources 1*a* and 1*b* and the transistors $Q_{1a}$ and $Q_{1b}$ may then be time shared with 15 other groups through other switches, just as may other components not within a dotted line box 20 enclosing one of 64 groups of sixteen lines, because only one line of one group is to be driven at any given time.

The pulsed current drive sources 3*a* and 3*b* may also be time shared with all 16 lines of any group selected by 15 other sets of switches 4a and 4*b*. For example, selection diodes $D_{3a}$ and $D_{3b}$ couple the ninth line of the group shown to distribution lines or buses 21 and 22, respectively. Similar selection diodes couple the ninth drive line of the other 15 groups within a block to the distribution lines 21 and 22. The diodes 13*a* and 13*b* couple the respective distribution lines 21 and 22 to the drive switches 4*a* and 4*b*. The drive switches are coupled through similar diodes to distribution lines on the other three blocks. The 15 other sets of drive switches are similarly associated with other pairs of distribution lines through drive diodes just as drive diodes $D_{13a}$ and $D_{13b}$ couple the respective switches 4*a* and 4*b* to the distribution lines 21 and 22.

For a memory containing over 5 million bits and having 1,024 word lines, a total of 5,120 bit lines must be provided in sets. All corresponding bit lines of a selected set may be driven during a read cycle and conditional half-select current may be provided during a write cycle under the control of data word bits to be stored. The addressing of sets may be implemented by any one of a number of techniques.

For a read cycle, the bit lines are energized first with half-select current. The pulsed drive current source for the word line is then activated when the bit (y-drive) current pulse has reached a steady level. In that manner, the bit lines may be used as sense lines since a core being switched from the "1" state to the "0" state will induce a pulse on the bit line of that core during the period of the word line drive current pulse.

From this general description of a large 2½D system it can be appreciated that the word lines are extremely long, thereby making the problems to which the present invention relates more critical, namely charging, damping, terminating and discharging word drive lines. To minimize noise and cross-talk between such long word drive lines, the lines of the 32 groups driven from the left may be interlaced with lines of 32 groups independently driven from the right as will be more fully described with reference to FIG. 4. Since only one group of lines is charged at one time, the lines adjacent a driven line will be uncharged and connected to circuit ground through transistor shunt switches.

As noted hereinbefore, reference to a 2½D memory system is by way of example only, and not by way of limitation. The invention may be used to advantage in other systems where drive lines are sufficiently long to require significant time and energy to charge them before a controlled current pulse is driven through.

The present invention will now be described in detail with reference to a read cycle. It will then be apparent how a write cycle operates. Initially, the pulsed current source 1*a* is inactive and the transistor $Q_{1a}$ is conducting. To start the read cycle, the transistor $Q_{1a}$ is turned off. Simultaneously, the switches 2*a* and 4*a* are activated and the current source 1a is pulsed. The pulsed drive current source 3*a* is not activated until later.

The pulsed current source 1*a* supplies energy to charge the distribution line 13, including the selecting network, and all lines of the selected group including the line $LL_1$, from near circuit ground potential toward $+V_S$ through several voltage pulse reflections. When the distribution line 13 has been charged to substantially $+V_S$, a resistor 8a then terminates the selected group of lines with approximately their characteristic impedance to suppress reflections and ringing at the sink end. In the meantime, the collector of the transistor $Q_{1a}$ will increase the bias on a set of resistors, such as a resistor 7*a*, in order to maintain the voltage across the selection diodes, such as the diode $D_{3a}$, substantially constant. At the same time, the transistor $Q_{1b}$ is kept on to couple a slight positive voltage to the anode of other selection diodes, such as the diode $D_{3b}$, thereby reducing voltage stresses on selection elements.

It should be noted that diode $D_{13a}$ is not required in the implementation shown in FIG. 3. However, in a full implementation, wherein multiple blocks of dynamic terminations are employed, diodes $D_{13a}$ and $D_{13b}$ are required in each branch as shown to prevent sneak paths through the unselected resistors, such as 7*a* and 7*b*.

Once the sink distribution line 13 has achieved the full voltage of $+V_S$ plus the voltage developed by current through diodes $D_{1a}$ and $D_{2a}$ and resistor 8*a*, the drive current source 3*a* may be activated. That immediately forward biases diode $D_{5a}$ to connect resistor 9*a* to the selected line via the switch 4*a*. The resistor is chosen to have approximately the characteristic impedance of a single drive line. Thus, the diode $D_{5a}$ and resistor 9a terminate the selected memory line during the current rise time to prevent overshoot and ringing.

During the flat top of the current drive pulse, the current in the resistor 9*a* reduces to zero because the voltage on the current source 3*a* will then be such as to reverse bias the diode $D_{5a}$ slightly, or to at least have the diode $D_{5a}$ insufficiently forward biased to conduct. In other words, the voltage at the point V', which is above the voltage $+V_S$ by the amount produced by the IR-drop across the network comprising diode $D_{1a}$, resistor 8*a*, and diode $D_{2a}$, will drop across the line $LL_1$, diode $D_{3a}$, diode $D_{13a}$ and switch 4*a* to a level approximately equal to the supply voltage $V_S$. In that manner, the resistor 9a is effective to terminate the drive end of the selected line during the current rise time and is virtually disconnected from the drive circuit during the flat top of the current drive pulse.

To assure that the voltage at point V' does remain substantially constant, a sink voltage stabilization means may be provided as shown in either FIG. 1 or FIG. 2.

At the end of the positive drive interval, the current pulse sources 1*a* and 3*a* are deactivated and the transistor $Q_{1a}$ is again turned on to discharge the selected group of lines through diode $D_{7a}$ and resistor 5a. That also returns all positive drive bias resistors, such as resistor 7a, to virtually circuit ground established by connecting the emitter of the transistor $Q_{1a}$ to a negative source of voltage $-V$ selected to provide at point V' a voltage substantially equal to zero with reference to circuit ground.

It should be noted that every line of the selected group has its selection diodes biased in the same manner as diodes $D_{3a}$ and $D_{3b}$ through separate pullup resistors. Therefore, when the drive current source 3*a* is activated, current through the diode $D_{3a}$ will have virtually no effect on the bias across other corresponding selection diodes. It should also be noted that the transistor $Q_{1a}$ is time shared with all groups, as are the diodes $D_{7a}$ and $D_{2a}$ and resistor 5*a* and 8*a*.

For a write cycle, switches 2*b* and 4*b* are used with current sources 1*b* and 3*b* to provide current of opposite polarity through the selection diode $D_{3b}$. That brings into operation a bias resistor 7*b*, a terminating resistor 8*b* at the sink end, a damping and terminating resistor 9*b* and a discharge diode $D_{7b}$. The transistor $Q_{1b}$ is turned off during the write cycle to allow this corresponding set of circuit components to be engaged through associated diodes poled for opposite currents from corresponding diodes engaged in a read operation.

Figure 4:
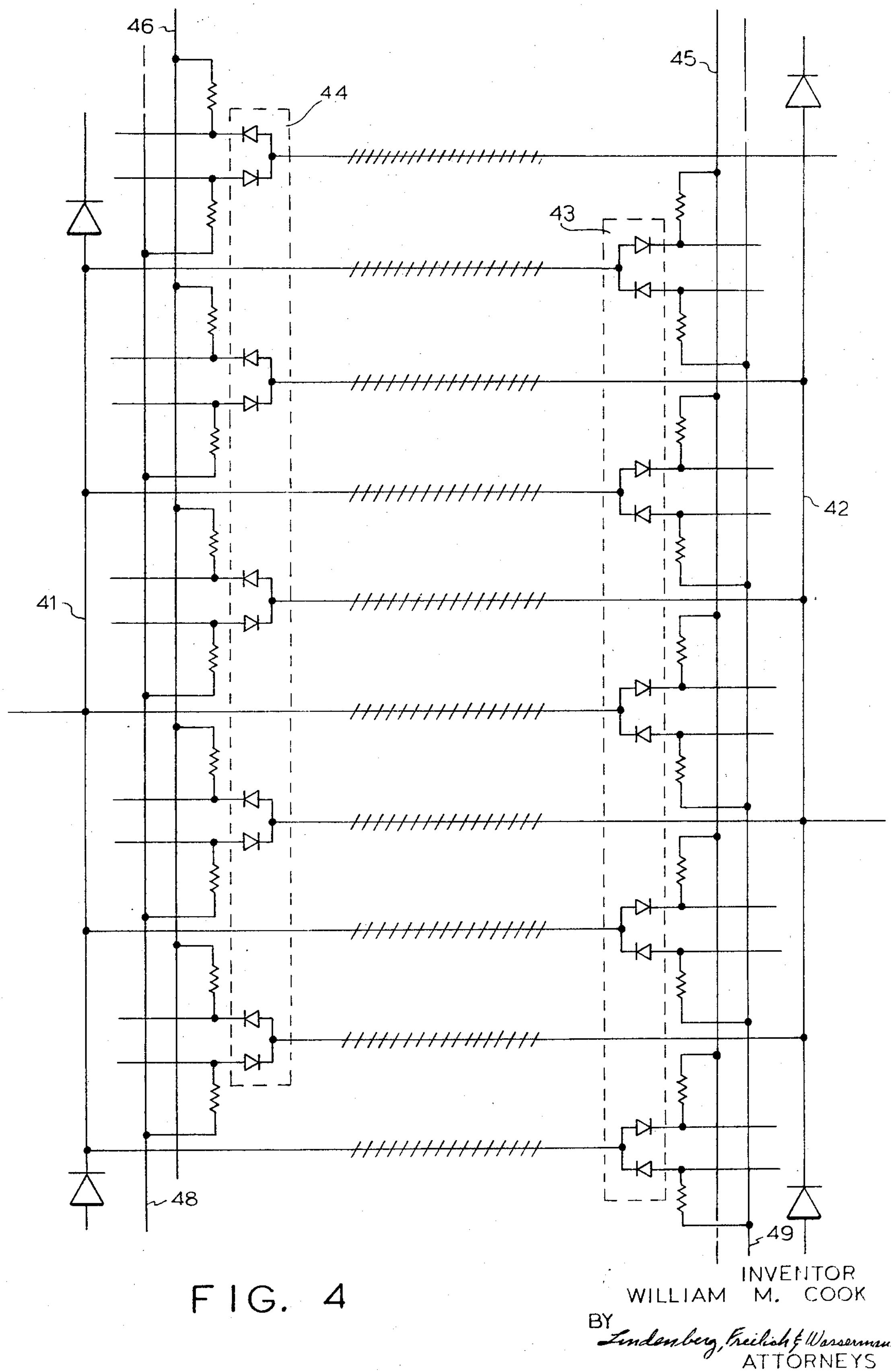
FIG. 4 is a schematic diagram showing the manner in which two sections of a line drive system may be interlaced so that while one section is being used to drive a line, adjacent lines of the unused section provide noise and cross-talk isolation from other lines in the used section.

Referring now to FIG. 4, two groups of word drive lines are shown to illustrate the advantage of interlacing lines of two blocks. One group of lines is connected to a distribution line 41 selected by switches corresponding to switches 2*a* and 2*b* of FIG. 3. Accordingly, the first group may be considered to be the group shown in the dotted box 20 of FIG. 3. The second group is connected to a distribution line 42 selected by switches in a similar but independent arrangement on the right.

Selection of one of the drive lines in the first group is through a bank of selection diodes 43 in a manner corresponding to the selection of the line $LL_1$ on FIG. 3. Selection of a drive line in the second group is similarly accomplished through a bank of selection diodes 44. A separate pullup bias resistor is connected to each selection diode of each interlaced group, but the bias resistors for cathodes of diodes in each bank are connected to separate distribution lines 45 and 46. Bias resistors for anodes of diodes in each bank are connected to separate distribution lines 48 and 49. Since each of these distribution lines are connected to circuit ground (or a source of potential near circuit ground) by switches corresponding transistors $Q_{1a}$ and $Q_{1b}$ in FIG. 3, except when one group is being selected, all lines of an unselected group are at circuit ground potential and both ends of each line of the unselected group is at the same potential since the distribution lines to which its selection diodes are connected through separate bias resistors are connected to the collectors of shunt transistors. Accordingly, when one drive line is selected from one of two interlaced groups, the selected drive line is isolated from other drive lines of the selected group by drive lines from the unselected group to minimize noise and cross-talk in the selected drive line. Thus, the novel manner in which the bias is provided for the selection diodes, and the manner in which unselected groups are discharged through shunt switches, makes it possible to isolate a selected drive line with effectively grounded drive lines on each side.

Since the group of drive lines connected to the distribution line 42 run in a direction opposite to the lines connected to the distribution line 41, the current polarities selected for read and write cycles in the two groups of lines are such that read current in any line of either group is from left to right, and write current in any line of either group is from right to left. However, such a choice of polarities is completely arbitrary, and all polarities may be reversed. All that is required is that the sense of the current through cores being addressed is proper for the sense of current provided by bit drive lines during read and write cycles. Accordingly, polarities for read and write currents selected for FIG. 3 are by way of example only.

Although the present invention has been described with reference to a particular embodiment adapted for a particular memory organization, other embodiments, applications and modifications will be obvious to those skilled in the art. Consequently, it is intended that the claims be interpreted to cover such embodiments, applications and modifications.

What is claimed is:

1. In a circuit for applying a current pulse to a given one of a plurality of drive lines of a magnetic core memory, each line having a current sink end and a current drive end, said sink end of said given drive line being connected to a current pulse distribution line, the combination comprising:

a charging current pulse source;

means for charging said line to a predetermined potential with respect to circuit ground by applying a current pulse from said charging current pulse source to said distribution line while the drive end of each of said plurality of lines is substantially open, thereby allowing a voltage wave front created by said current pulse to be reflected back and forth across the lengths of said plurality of drive lines to charge said distribution line to said predetermined potential;

means for terminating said plurality of lines at their sink ends with their approximate characteristic impedance when said distribution line reaches said predetermined potential, thereby suppressing further reflections and ringing of current wave fronts in said lines; and means for applying a drive current pulse to said drive end of said given line while said current pulse source at said sink end is still active when said distribution line has been charged to said predetermined potential, the polarity of said drive current pulse being selected to produce current through said given line of the same polarity as current produced by said current pulse source of said charging means.

2. A circuit as defined in claim 1 wherein said terminating means comprises a resistor and a diode connected in series between a source of bias potential substantially equal to said predetermined potential and said distribution line, said diode being poled to be back biased by said bias source, whereby current flows through said terminating resistor only when said distribution line has been charged sufficiently to reach said predetermined potential.

3. A circuit as defined in claim 1 including low impedance means for discharging said drive lines connected to said distribution line after said current pulse of said charging means becomes inactive.

4. A circuit as defined in claim 3 wherein said discharging means comprises:

a three-terminal shunt switch adapted to provide a low impedance current path between first and second terminals thereof in response to a control signal on a third terminal thereof;

means DC coupling said first terminal of said switch to said distribution line; and a source of potential connected to said second terminal of said switch of a polarity opposite the polarity of said predetermined potential and of a magnitude selected for said distribution line to be discharged to substantially zero potential with respect to circuit ground through said unidirectional conducting means.

5. A circuit as defined in claim 4 wherein said terminating means comprises a resistor and a diode connected in series between a source of bias potential substantially equal to said predetermined potential and said distribution line, said diode being poled to be back biased by said bias source, whereby current flows through said terminating resistor only when said distribution line has been charged sufficiently to reach said predetermined potential.

6. A circuit as defined in claim 1 including:

a drive selection diode connected to the drive end of said given line and in series with said drive current pulse means, said diode being poled for conduction of current of the polarity of current pulses applied by said drive current pulse means to said drive end of said given line; and a bias resistor having first and second terminals, said first terminal being connected directly to one side of said diode remote from said given line, and said second terminal being connected directly to said charging means at a point always at substantially the same potential as said distribution line, whereby the bias potential at said one terminal of said bias resistor is increased to substantially said predetermined potential as said given line is charged and is decreased to substantially zero potential when said sink end of given line is discharged.

7. A circuit as defined in claim 6 including low impedance means for discharging said drive lines connected to said distribution line after said current pulse of said charging means becomes inactive.

8. A circuit as defined in claim 7 wherein said discharging means comprises:

a three-terminal shunt switch adapted to provide a low impedance current path between first and second terminals thereof in response to a control signal on a third terminal thereof;

means DC coupling said first terminal of said switch to said distribution line; and a source of potential connected to said second terminal of said switch of a polarity opposite the polarity of said predetermined potential and of a magnitude selected for said distribution line to be discharged to substantially zero potential with respect to circuit ground through said unidirectional conducting means.

9. A circuit as defined in claim 6 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

10. A circuit as defined in claim 9 wherein said means for terminating said plurality of lines at their sink ends comprises a resistor and a diode connected in series between a source of bias potential substantially equal to said predetermined potential and said distribution line, said sink terminating diode being poled to be back biased by said bias source such that current flows through said sink terminating resistor only when said sink end has been charged sufficiently to reach said predetermined potential, said predetermined potential being sufficient to forward bias said sink terminating diode, and wherein said drive terminating resistor is connected to one side of said sink terminating diode in series with said sink terminating resistor, where said one side is remote from said source of bias potential.

11. A circuit for applying a current pulse to a given one of a plurality of drive lines of a magnetic core memory, each line having a current sink end and a current drive end, comprising:

a current pulse distribution line connected to said drive lines at the sink ends thereof;

means for charging said given line to a predetermined potential with respect to circuit ground by applying a current pulse to said distribution line while the drive end of each of said plurality of lines is substantially open;

means for terminating said drive lines connected to said distribution line at sink ends thereof with their approximate characteristic impedance when said distribution line reaches said predetermined potential;

means for applying a drive current pulse to said drive end of said given line when said distribution line has been charged to said predetermined potential, the polarity of said drive current pulse being selected to produce current through said given line of the same polarity as current produced by said charging means; and means for maintaining said distribution line at substantially circuit ground potential except while said given line is being charged to said predetermined potential, and said charge current pulse means is active.

12. A circuit as defined in claim 11 including:

a drive selection diode connected to the drive end of said given line and in series with said drive current pulse means, said diode being poled for conduction of current of the polarity of current pulses applied by said drive current pulse means to said drive end of said given line; and a bias resistor having first and second terminals, said first terminal being connected directly to one side of said diode remote from said given line, and said second terminal being connected directly to said charging means at a point always at substantially the same potential as said distribution line, whereby the bias potential at said one terminal of said bias resistor is increased to substantially said predetermined potential as said given line is charged and is decreased to substantially zero potential when said sink end of given line is discharged.

13. A circuit as defined in claim 12 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

14. A circuit as defined in claim 11 wherein said terminating means comprises a resistor and a diode connected in series between a source of bias potential substantially equal to said predetermined potential and said distribution line, said diode being poled to be back biased by said bias source, whereby current flows through said terminating resistor only when said distribution line has been charged sufficiently to reach said predetermined potential.

15. A circuit as defined in claim 14 including:

a drive selection diode connected to the drive end of said given line and in series with said drive current pulse means, said diode being poled for conduction of current of the polarity of current pulses applied by said drive current pulse means to said drive end of said given line; and a bias resistor having first and second terminals, said first terminal being connected directly to one side of said diode remote from said given line, and said second terminal being connected directly to said charging means at a point always at substantially the same potential as said distribution line, whereby the bias potential at said one terminal of said bias resistor is increased to substantially said predetermined potential as said given line is charged and is decreased to substantially zero potential when said sink end of given line is discharged.

16. A circuit as defined in claim 15 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

17. A circuit as defined in claim 11 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

18. A circuit as defined in claim 14 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

19. A circuit for applying a current pulse to a given one of a plurality of drive lines of a magnetic core memory, each line having a current sink end and a current drive end, comprising:

first and second current pulse distribution lines connected to unique groups of said drive lines at the sink ends thereof, where said lines connected to said first and second distribution lines are disposed to lie substantially in a common plane, and interlaced by alternating lines of groups in said plane;

means for charging said given line to a predetermined potential with respect to circuit ground by applying a current pulse to one of said first and second distribution lines to which said given line is connected while the drive end of each of said plurality of lines is substantially open;

means for applying a drive current pulse to said drive end of said given line when said one distribution line has been charged to said predetermined potential, the polarity of said drive current pulse being selected to produce current through said given line of the same polarity as current produced by said charging means; and first and second low impedance switching means for maintaining said respective first and second distribution lines at substantially circuit ground potential except said one distribution line while said given line is being charged to said predetermined potential, and said charge current pulse means is active.

20. A circuit as defined in claim 19 including means for terminating said group of lines connected to said one distribution line, said means terminating said group of lines at sink ends thereof with their approximate characteristic impedance when said one distribution line reaches said predetermined potential.

21. A circuit as defined in claim 20 including:

a drive selection diode connected to the drive end of said given line and in series with said drive current pulse means, said diode being poled for conduction of current of the polarity of current pulses applied by said drive current pulse means to said drive end of said given line; and a bias resistor having first and second terminals, said first terminal being connected directly to one side of said diode remote from said given line, and said second terminal being connected directly to said charging means at a point always at substantially the same potential as said distribution line, whereby the bias potential at said one terminal of said bias resistor is increased to substantially said predetermined potential as said given line is charged and is decreased to substantially zero potential when said sink end of given line is discharged.

22. A circuit as defined in claim 21 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

23. A circuit as defined in claim 20 wherein said terminating means comprises a resistor and a diode connected in series between a source of bias potential substantially equal to said predetermined potential and said one distribution line, said diode being poled to be back biased by said bias source, whereby current flows through said terminating resistor only when said one distribution line has been charged sufficiently to reach said predetermined potential.

24. A circuit as defined in claim 23 including:

a drive selection diode connected to the drive end of said given line and in series with said drive current pulse means, said diode being poled for conduction of current of the polarity of current pulses applied by said drive current pulse means to said drive end of said given line; and a bias resistor having first and second terminals, said first terminal being connected directly to one side of said diode remote from said given line, and said second terminal being connected directly to said charging means at a point always at substantially the same potential as said distribution line, whereby the bias potential at said one terminal of said bias resistor is increased to substantially said predetermined potential as said given line is charged and is decreased to substantially zero potential when said sink end of given line is discharged.

25. A circuit as defined in claim 24 including means for terminating said given line at the drive end thereof during the rise time of a drive current pulse comprising:

a resistor equal to the approximate characteristic impedance of said given line; and means for coupling said resistor between a point in said charging means always at substantially the same potential as said distribution line and a point in said drive current pulse means.

* * * * *